United States Patent [19]
Ketseoglou

[11] Patent Number: 6,145,108
[45] Date of Patent: Nov. 7, 2000

[54] RETRANSMISSION PACKET CAPTURE SYSTEM WITHIN A WIRELESS MULTISERVICE COMMUNICATIONS ENVIRONMENT

[75] Inventor: Thomas J. Ketseoglou, Irvine, Calif.

[73] Assignee: Conexant Systems, Inc., Newport Beach, Calif.

[21] Appl. No.: 08/923,722

[22] Filed: Sep. 4, 1997

[51] Int. Cl.[7] ............................. H03M 13/41; H04L 1/16
[52] U.S. Cl. .......................... 714/751; 714/795; 714/796
[58] Field of Search .................................. 714/748, 751, 714/795, 796, 780

[56] References Cited

U.S. PATENT DOCUMENTS

| | | | |
|---|---|---|---|
| 5,490,165 | 2/1996 | Blakeney, II et al. | 375/205 |
| 5,566,206 | 10/1996 | Butler et al. | 375/225 |
| 5,581,575 | 12/1996 | Zehavi et al. | 375/200 |
| 5,764,687 | 6/1998 | Easton | 375/206 |

OTHER PUBLICATIONS

Benelli, G., "Some ARQ Protocols with Finite Receiver Buffer", IEEE Transactions on Communications, vol. 41, No. 4, Apr. 1993, pp. 513–523.

Lee, I. et al., "A Study on the Performance Analysis of Error Control Algorithms in Digital Cellular DS/CDMA Systems", ICC '94, pp. 908–912, Dec. 1994.

Souissi, S. et al., "A Diversity Combining DS? CDMA System with Convolutional Encoding and Viterbi Decoding", IEEE Transactions on Vehicular Technology, vol. 44, No. 2, May 1995, pp. 304–312.

Zhao, H. et al., "A Hybrid ARQ Scheme for DS/CDMA Mobile Data Communications", Dec. 1996 Universal Personal Communications Conf., pp. 71–75.

*Primary Examiner*—Stephen M. Baker
*Attorney, Agent, or Firm*—Price, Gess & Ubell

[57] ABSTRACT

A "hybrid" ARQ system within a multiple access wireless communications environment is provided for-recombining ARQ retransmission signals with information obtained from corresponding previously failed transmissions of the same signal which had been sent and received within the air interface. Forward Error Correction (FEC) is implemented within an ARQ environment by using whatever acquired information has been previously obtained from RAKE processed transmitted and retransmitted signals and trying to correct the information by combining the signals and without retransmission.

7 Claims, 3 Drawing Sheets

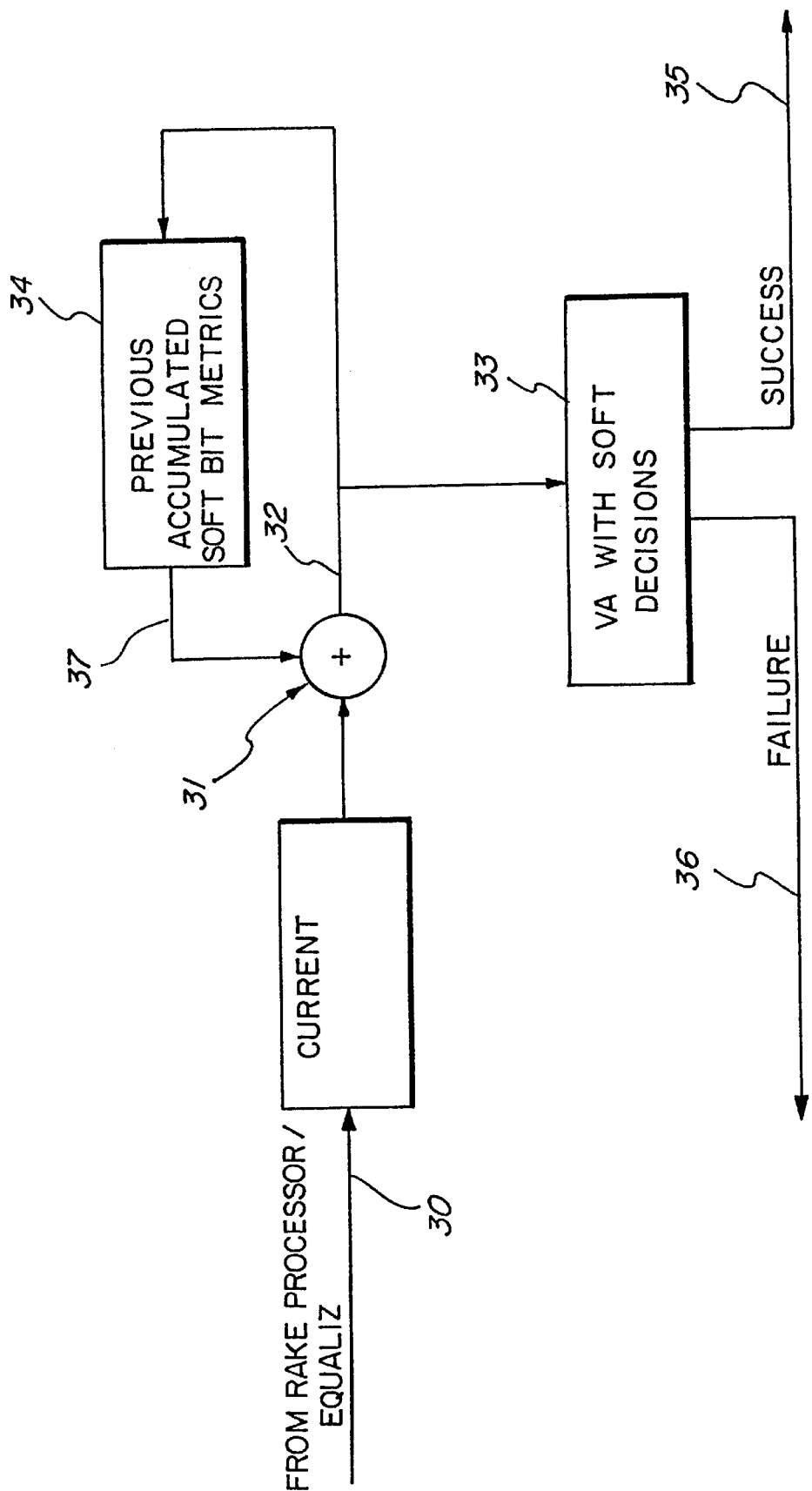

RETRANSMISSION PACKET CAPTURE SYSTEM WITHIN A WIRELESS MULTISERVICE COMMUNICATIONS ENVIRONMENT

FIELD OF THE INVENTION

The present invention relates generally to wireless communication systems, and more particularly, to a system and method for correctly transmitting and re-transmitting data packets in a wireless multi-media communications environment.

BACKGROUND OF THE INVENTION

Various organizations worldwide are currently developing standards for the specification of the next generation of mobile telecommunications systems. Services offered by current wireless mobile systems are telephony and voice services supported by narrowband digital networks. There will be a demand for higher bandwidth services as more comprehensive data and information is transmitted. This comprehensive data will require mobile systems to interface with hardwired broadband networks using asynchronous transfer mode (ATM) transmission (defined below). Thus, today's wireless interface must carry narrowband services effectively while providing the flexibility to carry higher bandwidth services as the demand increases.

However, the harmonization of multiple communication services with different characteristics results in distinguishable spectrum and transmission needs. Representative services used on wireless communication networks include telephony, videotelephony, and high-speed data transmission. These services have varying and distinguishable needs which include being in high demand, being delay critical, requiring high bandwidth, and/or being intolerant of errors. These different services also have different encoding requirements, different error transmission requirements and different delay requirements. The trade-offs of these different requirements of the different services used on the network, when they are integrated into a single cohesive whole, lead to limitations in the ability of the network to transmit a large amount of information quickly, correctly and simultaneously.

The radio access technique most often utilized for these diverse requirements is known as code division multiple access (CDMA). CDMA and ATM characteristics, separately and in combination, offer significant advantages in wireless communication environments where a wide range of services must be carried. Both CDMA and ATM allow a transmission link to support a number of simultaneous connections which can be used on demand to simplify routing and reduce traffic congestion and overhead.

CDMA allows many users to share the same radio frequency spectrum simultaneously through the use of spread spectrum transmission. Each individual connection across the radio interface is distinguished by a CDMA code allocated to that connection. Since there is a relatively large number of codes, they can be allocated to new connections as the connections are set up or when a new mobile station affiliates to a base station servicing multiple users. User data is transmitted over the air interface with an associated CDMA code and without the need for additional channel assignments. Thus, the CDMA code identifies the signal and represents a "virtual" channel connection for the air interface.

A reality of wireless communications is that data is communicated at essentially random times. Additional data may be added to the system and transmitted at any time. These random transmissions may, in the aggregate, force the system capacity to be exceeded and cause interference between users. These dynamically changing traffic characteristics may increase above system limitations and cause unacceptably excessive error rates.

ATM subdivides data for transmission into small fixed size packets called ATM cells which contain groups of information. Each ATM cell includes a data field and a control field which includes an address. The address within the control field can also be considered a virtual channel connection within a fixed network since multiple users are each identified by a separate address allocation. ATM is unlike traditional transmission systems in that it is asynchronous, and only uses network capacity when there is data to be transmitted.

Another communications transfer mode known in the art is time division multiple access (TDMA). TDMA is similar to ATM, with the exception that TDMA is not asynchronous. Each TDMA transmitter sends a "cell" of information each time it is "polled."

In mobile digital information transmission techniques, specifically CDMA, ATM and TDMA, data information is considered to be "bursty" in that significant amounts of data are reduced to "packets" and transmitted in "bursts." Burst mode transmission results in information packages being sent and packetization delays. The process of filling ATM cells with speech also involves packetization delays.

The inherent nature of radio communications, in terms of transmitter power constraints and limited spectrum availability, also restricts the maximum amount of information which is possible to be transmitted over an air interface. Thus, within an air interface, broadband communication services must be regarded as being similar to narrowband services due to the mobile power constraints and the limitations of the data transfer rate on the air interface network. Additionally, radio transmission is significantly more error prone than broadband hard-wired networks. This tends to further reduce capacity due to the necessity to transmit and process error control protocols.

The standard known in the art which was created by the International Telecommunications Union (ITU) for the wireless multimedia communications environment is known as IMT-2000. FIG. 1 shows a graphical depiction of the various subsystems of a mobile radio station in conjunction with an associated base station within a multiple access environment under the IMT-2000 standard.

In FIG. 1, the base station 12 includes a base station control 11 which controls the base station 12. The base station 12 communicates over a wireless interface 13 to a mobile station 14. The mobile station also includes a mobile station control 15. Each of the systems graphically shown in FIG. 1 includes the following subsystems, an internal network 16, link access control subsystems 17, medium access control subsystems 18, and the physical radio air interface transmission system 19.

Current wireless communication of data, as used and as planned for implementation with IMT-2000, uses a system of error correction and reliability known as "Automatic Repeat Request" (ARQ). ARQ is a strategy of error correction which requests the re-transmission of a packet of data when the transmission is not completely and accurately received.

In ARQ, the receiver provides a signal to the corresponding data packet transmitter that the information data packet was not adequately received. Upon receipt of the ARQ signal, signifying an error in the previous transmission, the transmitter again re-transmits the data packet to the receiver. This process is reiterated until the data packet is adequately received. The receiver is then able to receive the next data packet to be sent.

The ARQ process causes system delays as identical information is transmitted and retransmitted over and over again until the signal representing the data packet is deemed acceptable or is considered to have failed and the transmission of that information data packet is aborted. These retransmissions of identical information add unwanted network traffic causing system degradation and interference.

One system architecture utilized in wireless spread spectrum communications is known as pre-combining "rake." In this rake architecture, multiple path parameters for the received signal are derived from a downlink pilot signal and used for phase, amplitude, and time alignment of the various multiple path components which are combined prior to demodulation. Essentially, pre-combining rake recognizes that a single transmitted signal sent over a wireless communications link will have multiple components or "metrics" which must be combined by a receiver to obtain a single accumulated signal input for the Viterbi Algorithm, known in the art.

When the rake architecture is used within wireless communications systems, a transmission is deemed to fail when insufficient multiple path components are received and their combined power level is not above a predetermined threshold.

When the transmission fails, the rake receiver must undertake an error correction system. It transmits an ARQ request. The information signal is then re-transmitted by the transmitter. This process is reiterated until the signal is deemed to be adequately received, i.e., it is above the predetermined power threshold when rake recombination is completed.

However, the addition of multiple transmissions of the same signal adds unwanted traffic within the transmission network. Further, the rake system has power constraints due to multiple users on the network with different power availability. One user's transmission may interfere with the power level of another user's reception.

OBJECTS OF THE INVENTION

It therefore is an object of the present invention to provide an improved system for providing a wireless telecommunications system which will effectively carry narrowband services while providing the flexibility to carry higher bandwidth services.

It is a further object of the present invention to provide a wireless communications system which effectively addresses the differing wireless communications transmission and spectrum needs of multiple services (such as telephony, videotelephony, and high-speed data transmission), including being delay critical, requiring high bandwidth, and being intolerant of errors.

It is yet a further object of the present invention to provide a transmission system within a multiple access wireless communications environment which reduces unnecessary and unwanted information traffic on the network, reduces interference between users, addresses dynamically changing traffic characteristics in a way which provides for gradual degradation of system quality when network traffic limitations are exceeded and thereby reduces unacceptable communications errors.

It is still a further object of the present invention to provide a transmission system within a multiple access wireless communications environment which minimizes the necessary number of ARQ retransmissions of identical information in order to obtain an acceptable signal and thereby reduces unwanted information traffic from the wireless network.

SUMMARY OF THE INVENTION

These and other objects and advantages are achieved by the present invention by implementing a "hybrid" ARQ system within a multiple access wireless communications environment. The system recombines ARQ retransmission signals with information obtained from corresponding previously failed transmissions of the same signal which had been sent and received within the air interface. The present invention is considered to be "hybrid" ARQ in that it implements Forward Error Correction (FEC) within an ARQ environment by using whatever acquired information it has already obtained and trying to correct the information without further retransmission.

The present invention recognizes that there is a trade-off between the number of ARQ transmissions within a network to obtain a single correct signal, and the interference caused by the re-transmission of the same signal over and over again until signal is correctly received. The present invention resolves this trade-off by processing the re-transmitted signal with the processed information already obtained from previously received corresponding signals which were transmitted and failed, i.e., they yielded an unacceptable resulting signal.

By combining corresponding re-transmissions, the present invention increases the likelihood that a successful transmission will be quickly achieved. The present invention recognizes that the probability of a successful transmission is geometrically increased as the number of correspondingly similar re-transmissions are combined to obtain a single correct signal. The combination of re-transmissions also allows the preferred embodiment of the present invention to minimize the number of likely retransmissions necessary to achieve a successful signal being received, and thereby reduces the information traffic on the network. This further allows an increase in the number of users on the network without excessive degradation of the quality of transmission by the gradual increase in users.

BRIEF DESCRIPTION OF THE DRAWINGS

The features, organization, advantages and objects of this invention will be fully understood from the following detailed description and the accompanying drawings. The drawings contained herein are not considered to be accurate depictions of the embodiments of the invention, but are provided for illustrative purposes only and are to be interpreted in conjunction with the attached specification.

FIG. 3 shows a graphical block diagram depiction of the hardware configuration used to implement the method of the preferred environment of the present invention as shown in FIG. 2.

DETAILED DESCRIPTION OF THE INVENTION

Figure 1:
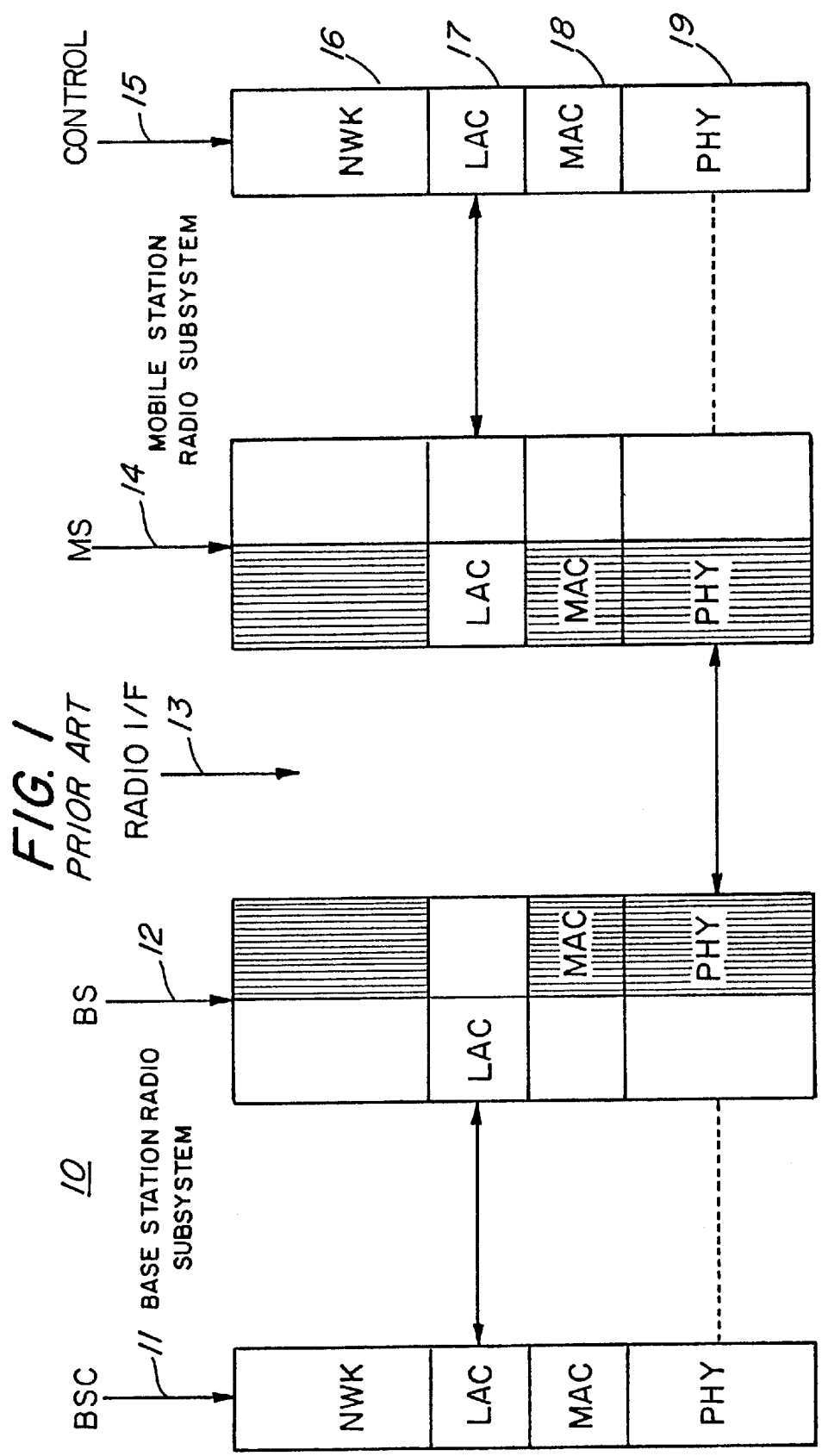
FIG. 1 shows a graphical depiction of the various subsystems of a mobile radio station in conjunction with an associated base station within a multiple access environment under the known IMT-2000 standard.

The following description is provided to enable any person skilled in the art to make and use the invention, and sets forth the best modes presently contemplated by the inventor for carrying out this invention. Various modifications, however, will remain readily apparent to those skilled in these arts, since the generic principals of the present invention have been defined herein.

The preferred embodiment of the present invention operates within a rake processing environment. The preferred embodiment determines when a first packet transmission is not adequately received by a transmitter. When the system determines that the first packet transmission is not adequately received, the receiver stores the resulting failed rake processed signal. An ARQ signal is then sent requiring retransmission of the signal by the transmitter.

The preferred embodiment then performs rake processing upon the second retransmitted signal. The system combines the previously stored first, failed, rake-processed transmission result with the corresponding second, rake processed retransmission result in an attempt to obtain an adequate signal. If the combined signal is still not adequate, the combined signal result is again stored, and the process is reiterated until a resulting signal is adequately obtained.

The preferred embodiment of the present invention reiterates the retransmission process until either (1) the resulting processed signal results in an adequate transmission being received, or (2) the system exceeds a default limitation of the number of reiterations allowed and the resulting failed signal is discarded. In the preferred embodiment of the present invention the maximum number of times, or reiteration threshold, for allowable retransmission of data packets may be set on a per service basis. For example, a voice signal communication will have a lower reiteration threshold than high-speed data since each transmission error will have less of an affect on the outcome.

The preferred embodiment of the present invention determines if the rake processed received signal is acceptable by testing whether the processed signal has sufficient power to yield an error free result as an input for the Viterbi Algorithm. The system of the preferred embodiment of the present invention recognizes that the metrics of the transmitted signal take multiple paths across the air interface to the receiver. Due to this inconsistency in the paths of the multiple metrics of a single signal, the rake processing of the metrics may result in an unreliable signal being received. The preferred embodiment recognizes that the power level of the rake processed signal is a likely determinant of whether the signal is reliable in relation to the noise incurred across the air interface.

The preferred embodiment implements the present invention by combining transmitted and retransmitted signals based upon the following equation:

$$M_n(L)=M_n(L-1)+\Delta m_{n,L}$$

where: M is the accumulation of the soft decision bit metrics resulting from the rake processing of the transmissions, L is the number of the transmission within the multiple corresponding signals being transmitted and retransmitted, n is the number of the bit within the data information packet being transmitted, Dm is the incremental, soft decision bit reception metric from the Lth, or last, transmission.

Figure 2:
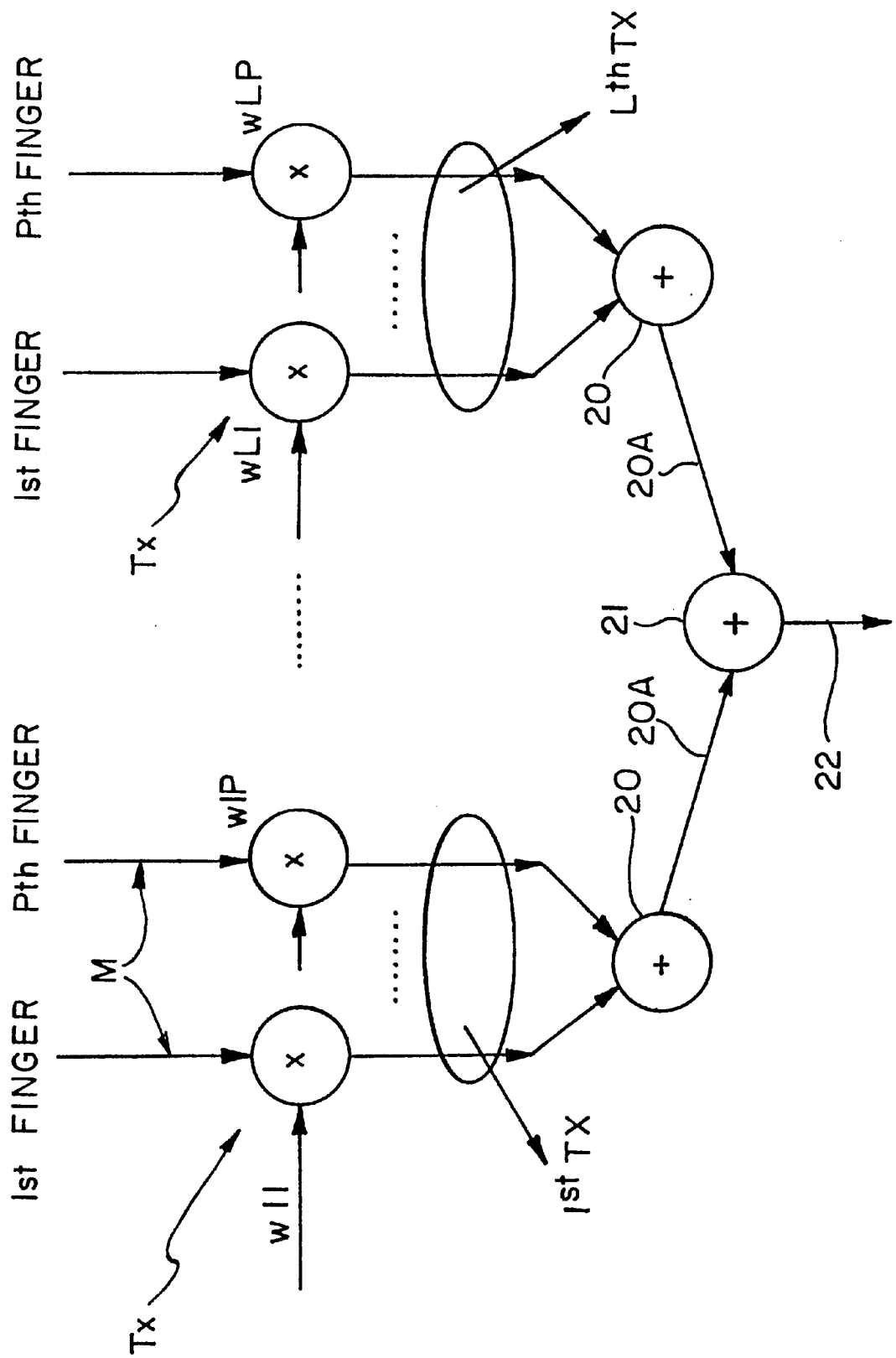
FIG. 2 shows a graphical depiction of the algorithm used by the preferred embodiment to implement the system of the present invention.

FIGS. 2 and 3 show a graphical depiction of the algorithm used by the preferred embodiment to implement the system of the present invention. As shown in FIG. 2, each transmission TX is comprised of a series of metrics or fingers M. Each of these metrics M symbolizes a different one of the multiple path components of the transmission TX traveling across a different path over the air interface from a transmitter to a receiver.

The reliability of each metric M is determined based upon the path that it takes across the air interface. As shown in FIG. 2, each metric M is weighted by a value W during rake processing to determine the potential value and reliability of its contribution to the result of the overall received signal TX which is to be included within the Viterbi Algorithm. In the rake processing of the metrics M, the weighted metrics M from a single transmission are processed and added together by adder 20 to produce a single resulting outcome 20A which is to be included within the Viterbi Algorithm.

As illustrated by FIG. 2, each of the transmissions TX undergoes identical rake processing by the receiver. The preferred embodiment of the present invention further adds each of the raked signal outcomes 20A from each of the rake processed individual signals TX together through adder 21 in order to obtain a total combined output signal 22. This output signal 22 is statistically a reliable representation of the transmission TX, based upon the rake processing of each of signals TX, and their rake combination together into a single reliable signal 22 which may be included within the Viterbi Algorithm.

FIG. 3 shows a further graphical block diagram depiction of the hardware configuration used to implement the method of the preferred environment of the present invention as shown in FIG. 2. Each of the metrics M is rake processed with its counterpart metrics M from each transmission TX.

As shown in FIG. 3, the output representative 20A of each rake processed signal 20 is provided along the input 30. The input 30 is then fed into adder 31. The accumulated output 32 of adder 31 is sent to both memory 34 where it is stored and processor 33 where it is analyzed for processing within the Viterbi Algorithm.

If processor 33 determines that the processed transmission TX has been adequately received, then the representative signal of the transmission is used within the Viterbi Algorithm and sent along output 35 for further processing by the receiver. However, if the processor 33 determines that the output 32 is not an adequately useful signal, i.e., it does not have sufficient power to be representative of an adequate rake processed signal, then an output is sent along output line 36, and an ARQ signal is sent requiring further re-transmission from the transmitter.

The re-transmitted signal is received, rake processed, and the rake processed representative of the re-transmitted signal is again sent along input 32 to adder 31. The rake processed signal 30 is added by adder 31 to the previous accumulated rake processed results sent along line 37.

By implementing the shown system for recombining ARQ transmission signals with information obtained from corresponding previously failed transmissions of the same signal which had been sent and received across the air interface, the present invention is able to achieve a reduction in necessary traffic on a multiple access wireless communications network. The preferred embodiment of the present invention is further able to address the different transmission and spectrum needs of multiple services by reducing delay, addressing high bandwidth needs, reducing transmission errors, reducing interference and allowing for the gradual degradation of system quality when network traffic limitations are exceeded.

Those skilled in the art will appreciate that various adaptations and modifications of the just described preferred embodiment can be used and configured without departing from the scope and spirit of the invention. Therefore, it is to be understood that, within the scope of the appended claims, the invention may be practiced other than as specifically described herein.

What is claimed is:

1. A multiple access system of communication across a wireless interface comprising:
   a transmitter for transmitting a signal representative of a packet of information and retransmitting the signal representation of the packet of information;
   a receiver for receiving the signal representations of the packet of information; and
   a means for processing the signal representations of the packet of information by combining the transmitted signals with the retransmitted signals to obtain an output signal representation of the packet of information;
   the receiver sending an ARQ signal to the transmitter when the output signal is deemed to be unreliable, when a default power threshold is not exceeded, and the transmitter sending the retransmitted signal in response to the ARQ signal.

2. The system of claim 1 wherein the signal representation of the packet of information is retransmitted by the transmitter until the number of retransmissions exceeds a default limitation based upon whether voice, video or information is being transmitted.

3. A multiple access wireless communication system comprising a transmitter, a receiver, a means for sending an ARQ request signal from the receiver to the transmitter to retransmit a signal, a means for combining the retransmitted signal with information from previously received signals to obtain an output signal, wherein the means for sending sends the ARQ signal when the output signal is deemed to be unreliable when a default power threshold is not exceeded.

4. A processing system within a multiple access wireless communications environment, comprising: a receiver receiving signals transmitted from a transmitter, the signals being retransmitted in response to an ARQ request signal sent from the receiver to the transmitter, a first processor to combine metrics from each received signal to produce a first processor output signal, the first processor output signal being input to an accumulator, the accumulator receiving the first processor output signal and a memory output signal and providing an accumulated output to the memory and a second processor, the second processor testing the accumulated output and sending the ARQ signal if the accumulated output does not surpass a poser threshold.

5. A method of communication across a wireless interface within a multiple access system of communication, comprising the steps of:
   transmitting a signal representation of a packet of information;
   retransmitting the signal representation of the packet of information;
   receiving the signal representations of the packet of information;
   combining the transmitted signals with the retransmitted signals to obtain an output signal representation of the packet of information;
   deeming the output signal to be unreliable when a default power threshold is not exceeded;
   sending an ARQ signal to the transmitter when the output signal is deemed to be unreliable; and
   retransmitting the signal representation of the packet of information in response to the ARQ signal.

6. The method of claim 5 wherein the retransmitting step retransmits the signal representation of the packet of information until the number of retransmissions exceeds a default limitation based up on whether voice, video or information is being transmitted.

7. A multiple access system of communication across a wireless interface comprising:
   a transmitter for transmitting a signal representative of a packet of information and retransmitting the signal representation of the packet of information until the number of retransmissions reaches a default limitation based upon whether voice, video or information is being transmitted;
   a receiver for receiving the signal representations of the packet of information; and
   a means for processing the signal representations by combining the transmitted signal with the retransmitted signal to obtain an output signal representation of the packet of information.

* * * * *